May 1, 1962     D. NIEDERMAN     3,032,642
MIRROR STRUCTURES
Filed Jan. 15, 1960

INVENTOR.
DANIEL NIEDERMAN
BY
ATTORNEY

United States Patent Office 3,032,642
Patented May 1, 1962

3,032,642
MIRROR STRUCTURES
Daniel Niederman, Brooklyn, N.Y., assignor to Metaltex, Inc., Brooklyn, N.Y., a corporation of New York
Filed Jan. 15, 1960, Ser. No. 2,737
1 Claim. (Cl. 240—4.2)

This invention relates broadly to mirrors and especially to a mirror structure adapted to be used for close scrutiny of one's face and which mirror structure is adapted to be suspended from the neck of the user.

The prime objects of this invention are the provision of a mirror structure adapted to be removably suspended from the neck of the user and which mirror structure is provided with a combination handle and chest rest member adapted to be placed against the chest of the user at one, its lower end, and wherein the upper end supports a mirror which is both tiltable as well as rotatable or swivable, and wherein is employed in combination with said member a shielded and controlled light source for illuminating the user's face.

The foregoing and still other objects and advantages of the present invention will be more fully understood from the ensuing description in conjunction with the accompanying drawings, wherein:

FIG. 4 is a section taken along lines 4—4 of FIG. 1; and

Figure 1:
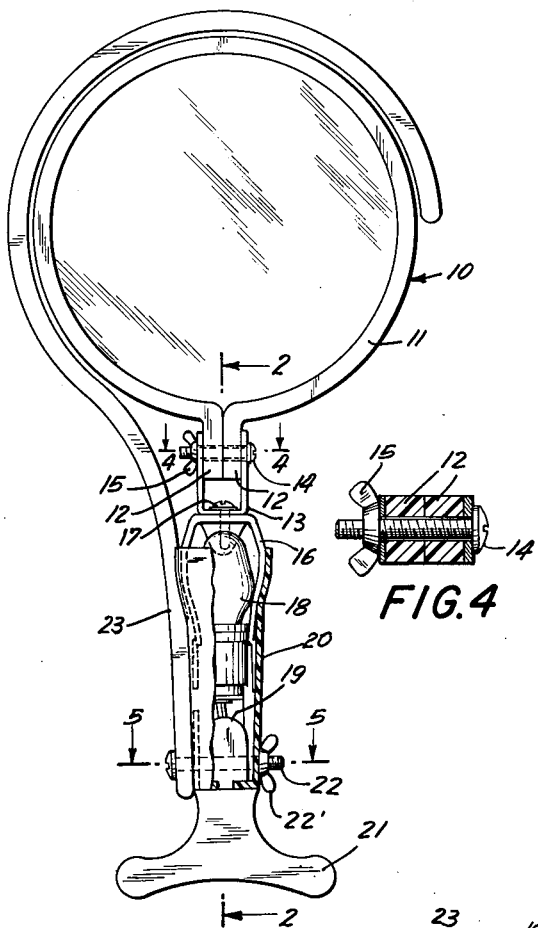
FIG. 1 is a plan view, partly in section, of the mirror structure according to the present invention.
Figure 2:
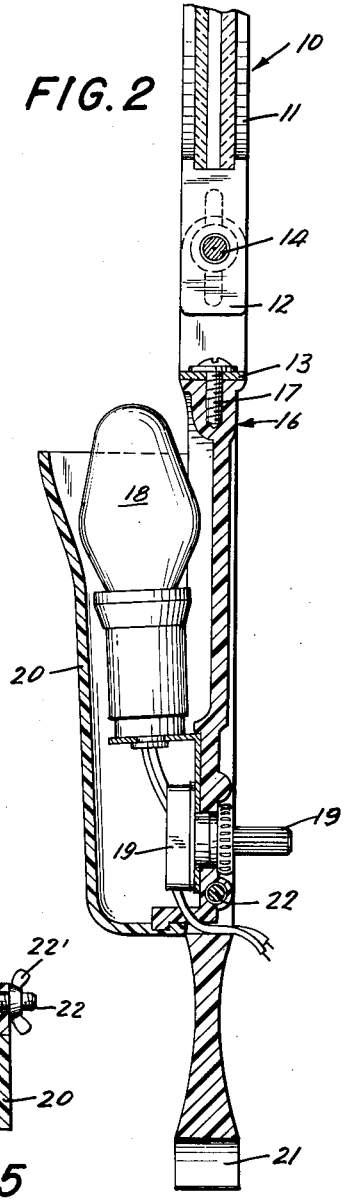
FIG. 2 is an enlarged lower portion of the mirror structure shown in section taken approximately along lines 2—2 of FIG. 1.
Figure 5:
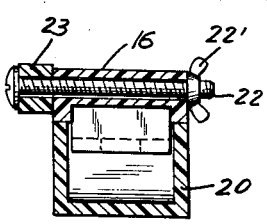
FIG. 5 is a section taken along lines 5—5 of FIG. 1.
Figure 3:
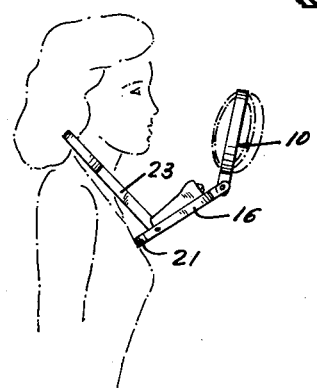
FIG. 3 illustrates the mirror structure in use and indicating in broken lines how the mirror can be rotated.

In the drawings numeral 10 denotes a mirror held in a peripheral frame 11, which latter terminates in two adjacent end lugs 12. These end lugs are joined together within a swivable yoke 13 by means of a bolt 14 passing through the two legs of yoke 13 and the lugs, and which bolt is equipped with a wing nut 15 for tightening the mirror frame ends within the yoke so that when the mirror is tilted to any desired position within yoke 13, it can be maintained at that tilted position by tightening the wing nut. Yoke 13 is attached to a combined handle and chest rest member 16 by means of a screw 17 which passes through the web of the yoke into the material of member 16 so that the yoke, and thus the mirror, can swivel or rotate as seen in FIG. 3. Yoke 13 therefore facilitates both the tilting as well as the swivelling movement of the mirror. Secured to member 16 is a light source 18 controlled by a switch 19, which latter is operable by means of knob 19' extending from the rear of member 16, as seen in FIG. 2.

Extending partly over light source 18 is a combination shield and light deflector 20, which is removably associated with member 16. The lower end of the combination handle and chest rest member 16 is provided with a curved enlargement 21, and just above said enlargement there is secured, by means of adjusting bolt 22, a hook-shaped suspension member 23 which is adapted to the placed with its curved upper end about the neck of the user, while end enlargement 21 of member 16 is placed against the chest of the user. Shielded light source 18 is adapted to illuminate the face of the user, but prevents direct light rays from interfering with the image seen in the mirror. Hook-shaped suspension member 23 is rendered adjustable by means of bolt 22 and wing nut 22'. Thus when hook-shaped member 23 is slipped around the neck, the chest rest enlargement 21 is placed against the chest and member 16 is adjusted to the desired position and nut 22' is tightened. The user then can swivel and tilt mirror 10 to its most advantageous position at which the wearer wishes to observe his face. Now he can turn switch 19' to let bulb 18 light his face for better observation.

While the above described procedure pertains to the structure as shown in the drawings, illustrating a specific embodiment thereof, it is obvious that during its commercial manufacture modifications or changes may be required, without, however, deviating from the main principal feature of providing both tilting and swiveling motions for a neck-suspended, adjustable mirror provided with a controlled and shielded light source.

Having thus described my invention, what is claimed as new is:

In a combination mirror structure adapted for removable suspension about the neck of the users, a one-piece handle having a chest rest extending laterally from its lower end, a yoke provided at the upper handle end, connecting means passing through the web of the yoke and extending into the handle for effecting a swivel movement of the yoke in respect to the handle, a one-piece, substantially circular mirror frame terminating in two adjacent lugs, the latter extending into said yoke, and serving for tightening said mirror frame about a mirror, a bolt passing through the arms of the yoke and through said frame lugs, a wing nut engaging the bolt for causing the yoke arms to engage the mirror frame lugs so that the mirror frame can be adjusted to any desired tilted position; a mirror held in the mirror frame as the frame lugs are being brought together in said yoke by tightening the latter by means of said bolt and said wing nut, an arcuate suspension member partly encompassing the mirror frame, the lower end of said suspension member extending toward the chest rest of the handle, a tightening bolt passing through the handle and the lower end of said suspension member, a light bulb and a switch controlling the latter both being secured to the handle above its chest rest, and a combination light shield and a light deflector removably associated with the handle and partly enclosing said light bulb.

References Cited in the file of this patent
UNITED STATES PATENTS

| | | |
|---|---|---|
| 2,026,010 | Ritz-Waller | Dec. 31, 1935 |
| 2,176,620 | Beam | Oct. 17, 1939 |
| 2,262,875 | Almer | Nov. 18, 1941 |
| 2,267,132 | Pavenick | Dec. 23, 1941 |
| 2,292,038 | Benander | Aug. 4, 1942 |
| 2,300,523 | Reichart | Nov. 3, 1942 |
| 2,352,819 | Winslow | July 4, 1944 |

FOREIGN PATENTS

| | | |
|---|---|---|
| 175,171 | Switzerland | Apr. 16, 1935 |